United States Patent
Hewel et al.

(10) Patent No.: US 8,324,297 B2
(45) Date of Patent: Dec. 4, 2012

(54) PARTIALLY AROMATIC MOULDING COMPOSITIONS AND THEIR USES

(75) Inventors: Manfred Hewel, Domat/Ems (CH); Andreas Bayer, Domat / Ems (CH)

(73) Assignee: EMS-Patent AG, Domat/Ems (CH)

( * ) Notice: Subject to any disclaimer, the term of this patent is extended or adjusted under 35 U.S.C. 154(b) by 0 days.

(21) Appl. No.: 13/014,303

(22) Filed: Jan. 26, 2011

(65) Prior Publication Data

US 2011/0184099 A1 Jul. 28, 2011

(30) Foreign Application Priority Data

Jan. 28, 2010 (EP) .................... 10 151 933

(51) Int. Cl.
- C08K 5/04 (2006.01)
- C08K 5/53 (2006.01)
- C08K 5/5313 (2006.01)
- C08K 5/3492 (2006.01)
- C08K 3/22 (2006.01)
- C08K 3/26 (2006.01)
- C08K 3/30 (2006.01)
- C08K 3/34 (2006.01)

(52) U.S. Cl. ........ 524/100; 524/126; 524/133; 524/400; 524/413; 524/423; 524/424; 524/425; 524/447; 524/449; 524/451; 524/494; 524/602; 524/607

(58) Field of Classification Search .................. 524/413, 524/423, 424, 425, 447, 449, 51, 494, 602, 524/607, 451, 100, 126, 133, 400
See application file for complete search history.

(56) References Cited

U.S. PATENT DOCUMENTS

| 4,607,073 A | 8/1986 | Sakashita et al. |
| 4,617,342 A | 10/1986 | Poppe et al. |
| 4,831,108 A | 5/1989 | Richardson et al. |
| 2005/0038171 A1* | 2/2005 | Elkovitch et al. ............. 524/494 |
| 2009/0098325 A1* | 4/2009 | Uchida et al. ............. 428/36.91 |

FOREIGN PATENT DOCUMENTS

| EP | 1 542 295 A1 | 6/2005 |
| EP | 1 795 632 A1 | 6/2007 |
| EP | 1 988 113 A1 | 11/2008 |
| GB | 1 228 761 A | 4/1971 |
| JP | 2928325 B2 | 4/1991 |

* cited by examiner

Primary Examiner — Kriellion Sanders
(74) Attorney, Agent, or Firm — Sughrue Mion, PLLC

(57) ABSTRACT

Polyamide molding composition, in particular for use for components of electronic and/or electrical components, having the following composition:
(A) 30-100% by weight of a partially aromatic, partially crystalline copolyamide made up of
  100% by weight of diacid fraction composed of:
    72.0-98.3% by weight of terephthalic acid (TPA) and/or naphthalenedicarboxylic acid;
    28.0-1.7% by weight of isophthalic acid (IPA)
  and 100% by weight of diamine fraction composed of:
    51.0-80.0% by weight of 1,6-hexanediamine (HMDA);
    20.0-49.0% by weight of aliphatic, unbranched C9-C12-diamine;
(B) 0-70% by weight of fillers and reinforcing materials;
(C) 0-25% by weight of flame retardants;
(D) 0-5% by weight of additives;
where the components (A)-(D) add up to 100% by weight.

41 Claims, 1 Drawing Sheet

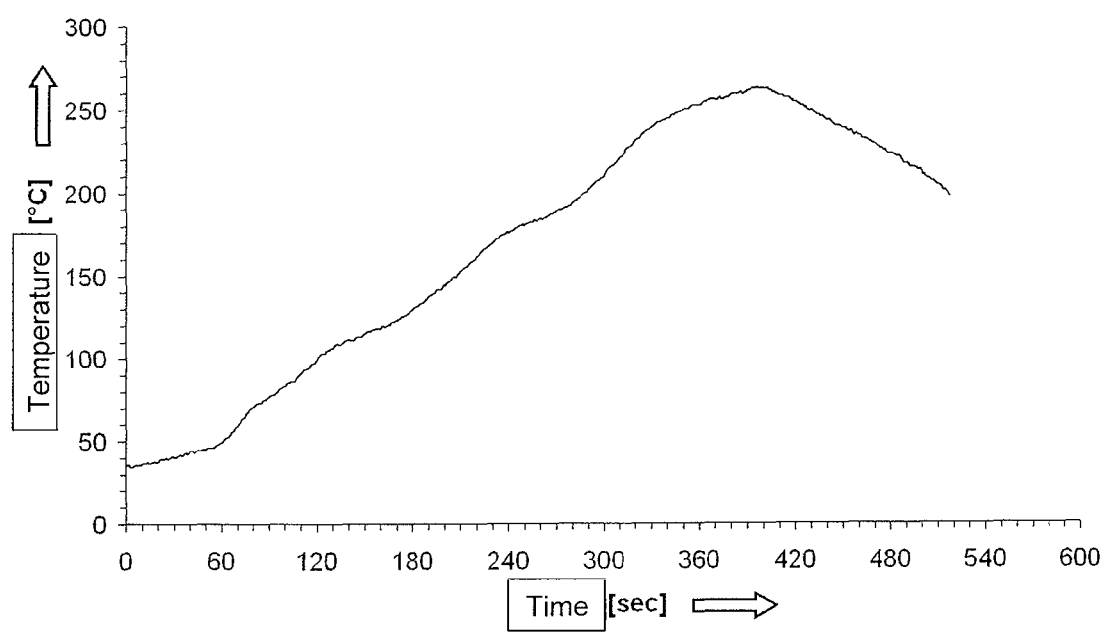

PARTIALLY AROMATIC MOULDING COMPOSITIONS AND THEIR USES

TECHNICAL FIELD

The present invention relates to polyamide moulding compositions based on a terephthalic acid copolyamide and processes for preparing them and uses thereof.

PRIOR ART

In the electrical and electronics sector, polymeric materials
which can be soldered without blisters, even after having absorbed water, by means of lead-free solder at a surface temperature of 260° C.,
which are made flame resistant without use of halogen-containing flame retardants,
which can be readily processed at low pressures and high flow lengths,
which have little distortion and
which are dimensionally stable,
are required Partially aromatic polyamides of the PA6T/6I type, as are described in U.S. Pat. No. 4,607,073, have a reduced water absorption and high melting points compared to the aliphatic polyamides PA6, PA66 and PA46. Even as raw polymer, they can be readily soldered. However, the content of halogen-free flame retardants is problematical because of the limited thermal stability of the flame retardant. Low pressures and long flow lengths in injection moulding are possible only at very high melt temperatures at which degradation of the polyamide begins to occur. Processing is extremely problematical because of the narrow processing window.

Partially aromatic polyamides of the PA6T/66 type as described in JP-B-2928325 (first publication as JP-A-308846) have high melting points but excessively high water absorptions. They can be soldered only in the dry state and achieve a maximum moisture sensitivity level (SML in accordance with Joint Industry Standard IPC/JEDEC J-STD-020D.1) of 2. They can be conditioned at 85° C. and 60% relative humidity for a maximum of 168 hours before soldering. This generally means that the electronic components made of these materials do not have an unlimited storage life and have to be packed in a moisture-tight manner until they are soldered.

EP 1 988 113 describes polyamides which have from 40 to 95 mol % of 10T units formed by the monomers 1,10-decanediamine and terephthalic acid and from 5 to 60 mol % of 6T units formed by the monomers 1,6-hexanediamine and terephthalic acid. These polyamides have high heat distortion resistances, good processability, low water absorption, unchanged mechanical properties after water absorption, good surface quality of the glass fibre-reinforced products and high dimensional stability. The solderability at 260° C. after absorption is significantly better than that of partially aromatic polyamides of the PA6T/66 type, but the solderability of the electrical and electronic components made of PA10T/6T is marginal, i.e. they can achieve the maximum moisture sensitivity level (SML in accordance with Joint Industry Standard IPC/JEDEC J-STD-020D.1) of 1 only when suitably designed. In the case of connectors having the critical thickness and metal inserts which conduct heat inwards, blisters can be formed on soldering.

U.S. Pat. No. 4,617,342 discloses crystalline polyamides which are obtained on the basis of terephthalic acid and isophthalic acid in a ratio of 80:20-99:1 and hexamethylenediamine (HMDA) and trimethylhexamethylenediamine (THMDA) in a molar ratio in the range from 98:2-60:40. Applications proposed for such polyamides are components having a high heat resistance, for example in the engine region of automobiles. This document speaks exclusively of a combination of HMDA and THMDA, and in the examples the proportion of THMDA present alongside hexamethylenediamine is low, in the region of 5-7 mol %. The object here is to provide polyphthalamides which have an increased strength. For this purpose, the TPA content is set to at least 80 mol %. However, this measure leads to these materials being very difficult to produce and process. For this reason, part of the HMDA is replaced by TMHMDA. This branched C9-diamine increases the concentration of amorphous domains, so that the moulding compositions become manageable again as a result of the lower crystallinity. However, these systems are not suitable for soldering applications.

GB 1228761 discloses completely amorphous polyamides based on terephthalic acid and isophthalic acid in which the proportion of isophthalic acid is high. The diamine isophoronediamine, a C9-diamine, which must be used in this document can be compared in terms of its effect with TMHMDA. In addition, the concentration of IPA is at least 50 mol % in all examples. Such moulding compositions cannot be soldered and clearly do not have the required mechanical properties.

U.S. Pat. No. 4,831,108 discloses a process for preparing polyamides which appears to be suitable for a range of completely different polyamides. Thus, this document describes not only the preparation of polyphthalamides but also the preparation of PA66 (Ex. 4) using the same process. Insofar as any reference is made to THMDA in this document, this diamine is always used in a small proportion.

EP 1795632 discloses a polyamide which can be obtained on the basis of a variety of starting materials. Diamines mentioned are, inter alia, C9-diamines including 1,9-nonanediamine and 1,8-methyloctanediamine. Inter alia, these diamines are reacted in combination with HMDA with TPA and IPA. The reaction is carried out using a very low HMDA concentration (HMDA:C9-diamine=20:80) or the hexamethylenediamine is even replaced by THMDA, which makes the resulting materials relatively unsuitable or even completely unsuitable for soldering applications.

DESCRIPTION OF THE INVENTION

It is an object of the invention to provide polyamide moulding compositions from which it is possible to produce electric and/or electronic components and which can be reliably soldered, i.e. in particular without blisters being formed in the soldering process, in particular at 260° C. and possibly higher temperatures after water absorption and in the case of critical designs of the components.

In addition, further requirements of the electrical and electronics industry have to be met. The polyamide moulding compositions should:
be able to be made flame resistant without use of halogen-containing flame retardants,
be able to be processed readily at low pressures and high flow lengths,
have little distortion and
be dimensionally stable.

The object is achieved by polyamide moulding compositions containing copolyamides comprising terephthalic acid (TPA), isophthalic acid (IPA), 1,6-hexanediamine (HMDA) and a further aliphatic diamine having from 9 to 12 carbon atoms (C9-C12-diamine), with a defined content of C9-C12-diamine, particularly preferably of aliphatic, unbranched C9-C12 diamine, and isophthalic acid being adhered to.

These copolyamides preferably have a melting point in the range from 300 to 330° C., a high crystallinity, a glass transition temperature which is preferably in the range from 110 to 140° C. and preferably a solderability (for definition see below) of the raw polymer (polyamide) of greater than 85% and of the compounds of greater than 75%. The solderability is defined as relative proportion of the positively tested rods of three different thicknesses without blisters under 6 different test conditions after conditioning for 168 hours at 85° C. and 85% relative humidity in accordance with Joint Industry Standard IPC/JEDEC J-STD-020D.1. The compounds preferably contain, in addition to the polyamide matrix, fillers and/or reinforcing materials and/or flame retardants and also additives.

Specifically, a polyamide moulding composition having the following composition is provided by the present invention:

(A) 30-100% by weight of a partially aromatic, partially crystalline copolyamide made up of
  100% by weight of diacid fraction composed of:
    72.0-98.3% by weight of terephthalic acid (TPA) and/or naphthalene-dicarboxylic acid;
    28.0-1.7% by weight of isophthalic acid (IPA)
  and 100% by weight of diamine fraction composed of:
    51.0-80.0% by weight of 1,6-hexanediamine (HMDA);
    20.0-49.0% by weight of C9-C12-diamine, in particular aliphatic, unbranched C9-C12-diamine;
(B) 0-70% by weight of fillers and reinforcing materials;
(C) 0-25% by weight of flame retardants;
(D) 0-5% by weight of additives;
where the components (A)-(D) add up to 100% by weight.

TPA can therefore be entirely or partly replaced by naphthalenedicarboxylic acid. According to a first preferred embodiment, the C9-C12-diamine is a diamine selected from the group consisting of: 1,9-nonanediamine, methyl-1,8-cctanediamine, 1,10-decanediamine, 1,11-undecanediamine, 1,12-dodecanediamine, or a mixture of such diamines, with 1,9-nonanediamine, 1,10-decanediamine, 1,11-undecanediamine, 1,12-dodecanediamine or a mixture of such diamines being preferred, 1,10-decanediamine and 1,12-dodecanediamine being particularly preferred and 1,10-decanediamine alone being especially preferred. It has surprisingly been found, in particular, that the use of branched aliphatic diamines such as TMHMDA leads to moulding compositions which simply cannot be soldered. The preferred use of a specific aliphatic, unbranched C9-C12-diamine in the above-mentioned proportions thus unexpectedly leads to moulding compositions which are particularly suitable for soldering processes.

The diamine fraction of component (A) is preferably composed of
  55.0-75.0% by weight of 1,6-hexanediamine (HMDA);
  25.0-45.0% by weight of C9-C12-diamine, in particular aliphatic, unbranched C9-C12-diamine.

The diamine fraction of component (A) is more preferably composed of 55.0-70.0% by weight of 1,6-hexanediamine (HMDA) and 30.0-45.0% by weight of C9-C12-diamine, in particular aliphatic, unbranched C9-C12-diamine.

In a particular embodiment of the invention, the proportion of C9-C12-diamines and the proportion of isophthalic acid are present in a particular ratio to one another. Specifically, this means that in this preferred embodiment, the diacid fraction of the component (A) is composed of
  72.0-98.3% by weight of terephthalic acid (TPA) and/or naphthalenedicarboxylic acid and an isophthalic acid (IPA) content in a % by weight range determined as a function of the content of C9-C12-diamine, in particular aliphatic, unbranched C9-C12-diamine, in per cent of the diamine fraction. The content of isophthalic acid in percent by weight determined according to the formula IPA (% by weight)=(39−0.7*C9-C12-diamine)

is in a range of +/−5% by weight. Naturally, with the proviso that the content of isophthalic acid is always at least 1.7% by weight.

This means that, for example at a content of C9-C12-diamines, in particular aliphatic, unbranched C9-C12-diamines, of 20% by weight, the content of isophthalic acid is in the range 20-30% by weight. At a content of C9-C12-diamines of 35% by weight, the content of isophthalic acid is in the range 9.5-19.5% by weight. At a content of C9-C12-diamines of 49% by weight, the content of isophthalic acid is in the range 1.7-9.7% by weight.

In a further preferred embodiment, the range is +/−3% by weight, particularly preferably +/−2% by weight.

Preference is thus given to polyamides having a C9-C12-diamine content, in particular an aliphatic, unbranched C9-C12-diamine content, of from 20 to 49% by weight based on the sum of the diamines and an IPA content of (39−0.7*C9-C12-diamine)±5% by weight based on the sum of the diacids, with the content of IPA always being at least 1.7% by weight.

In further particular embodiments, the following compositions are preferred for the copolyamides (polyamide matrix):

copolyamides having a (preferably aliphatic, unbranched) C9-C12-diamine content of from 20 to 49% by weight based on the sum of the diamines and an IPA content of (39−0.7*C9-C12-diamine)±3% by weight based on the sum of the diacids.

Copolyamides having a (preferably aliphatic, unbranched) C9-C12-diamine content of from 20 to 49% by weight based on the sum of the diamines and an IPA content of (39−0.7*C9-C12-diamine)±2% by weight based on the sum of the diacids.

Preference is given to polyamides having a (preferably aliphatic, unbranched) C9-C12-diamine content of from 25 to 45% by weight based on the sum of the diamines and an IPA content of (39−0.7*C9-C12-diamine)±5% by weight based on the sum of the diacids.

Copolyamides having a (preferably aliphatic, unbranched) C9-C12-diamine content of from 25 to 45% by weight based on the sum of the diamines and an IPA content of (39−0.7*C9-C12-diamine)±3% by weight based on the sum of the diacids.

Copolyamides having a (preferably aliphatic, unbranched) C9-C12-diamine content of from 25 to 45% by weight based on the sum of the diamines and an IPA content of (39−0.7*C9-C12-diamine)±2% by weight based on the sum of the diacids.

Preference is given to polyamides having a C9-C12-diamine content of from 30 to 45% by weight based on the sum of the diamines and an IPA content of (39−0.7*C9-C12-diamine)±5% by weight based on the sum of the diacids.

Copolyamides having a (preferably aliphatic, unbranched) C9-C12-diamine content of from 30 to 45% by weight based on the sum of the diamines and an IPA content of (39−0.7*C9-C12-diamine)±3% by weight based on the sum of the diacids.

Copolyamides having a (preferably aliphatic, unbranched) C9-C12-diamine content of from 30 to 45% by weight based on the sum of the diamines and an IPA content of (39−0.7*C9-C12-diamine)±2% by weight based on the sum of the diacids.

Among the further aliphatic diamines (C9-C12-diamine) preference is given to 1,10-decanediamine and 1,12-dodecanediamine, with particular preference being given to using 1,10-decanediamine.

In a further preferred embodiment, the proportion of component (B) is in the range 20-65% by weight.

The partially aromatic, partially crystalline copolyamide (component (A)) has a solution viscosity $\eta_{rel}$, measured in m-cresol (0.5% by weight, 20° C.), of not more than 2.0, preferably not more than 1.9, in particular not more than 1.8. Preference is given to copolyamides having a solution viscosity $\eta_{rel}$ in the range from 1.45 to 2.0, in particular in the range from 1.5 to 1.9 or from 1.5 to 1.8.

The copolyamides (component A) preferably have a glass transition temperature in the range from 110 to 140° C., preferably in the range from 115 to 135° C. and in particular in the range from 120 to 130° C.

The melting point is preferably in the range from 300 to 330° C., more preferably in the range from 305 to 325° C. and in particular in the range from 310 to 325° C.

The enthalpy of fusion of the copolyamides is preferably in the range from 30 to 60 J/g, more preferably in the range from 35 to 60 J/g and particularly preferably in the range from 40 to 60 J/g.

Furthermore, the compositions are preferably formulated so that the component (A) and/or the entire polyamide moulding composition has a water absorption of less than 5% by weight, preferably less than 4% by weight, e.g. after 336 hours in water at 95° C.

As long as the properties just described are achieved, up to 8% by weight, preferably up to 5% by weight and particularly preferably up to 3% by weight, of the aromatic dicarboxylic acids in the component (A) can be replaced by aliphatic dicarboxylic acids having from 10 to 36 carbon atoms. Preferred aliphatic diacids are sebacic acid and dodecanedioic acid. Furthermore, up to 8% by weight, preferably up to 5% by weight and particularly preferably up to 3% by weight, of the diamines can be replaced by 1,4-butanediamine, 1,5-pentanediamine, methyl-1,5-pentanediamine, bis(aminomethyl) cyclohexane, bis(4-amino-3-methylcyclohexyl)methane (MACM), bis(4-aminocyclohexyl)methane (PACM), m-xylylenediamine (MXDA) or p-xylylenediamine (PXDA). Based on the sum of diamines and diacids, up to 5% by weight of lactams or aminocarboxylic acids, in particular laurolactam or aminolauric acid, can be present in component (A). However, particular preference is given to the embodiment in which component (A) is formed exclusively by the aromatic diacids TPA and IPA and the diamines 1,6-hexanediamine and at least one C9-C12-diamine, in particular 1,10-decanediamine.

In a further preferred embodiment of the proposed polyamide moulding composition, the fillers and reinforcing materials of the component (B) are fibres, in particular glass fibres and/or carbon fibres, with particular preference being given to using short fibres, preferably having a length in the range 2-50 mm and a diameter of from 5 to 40 µm, and/or continuous fibres and in particular fibres having a circular and/or noncircular cross-sectional area, with in the latter case the length ratio of the main cross-sectional axis to the secondary cross-sectional axis preferably being >2, preferably in the range 2-8, particularly preferably in the range 2-5.

Preference is given to using glass fibres having a noncircular cross-sectional area and a length ratio of the main cross-sectional axis to the secondary cross-sectional axis of more than 2, preferably from 2 to 8, in particular from 2 to 5. These glass fibres, known as flat glass fibres, have an oval, elliptical, elliptical provided with constriction(s) (known as cocoon fibres), rectangular or virtually rectangular cross-sectional area.

The flat glass fibres having a noncircular cross-sectional area which are used according to the invention are preferably used as short glass fibres (cut glass having a length of from 0.2 to 20 mm, preferably 2-12 mm).

A further characterizing feature of the flat glass fibres used is that the length of the main cross-sectional axis is preferably in the range from 6 to 40 µm, in particular in the range from 15 to 30 µm, and the length of the secondary cross-sectional axis is in the range from 3 to 20 µm, in particular in the range from 4 to 10 µm.

It is also possible to use mixtures of glass fibres having circular and noncircular cross sections for reinforcing the moulding compositions of the invention, with the proportion of flat glass fibres as defined above preferably predominating, i.e. making up more than 50% by weight of the total mass of the fibres.

When reinforced moulding compositions having good flowability and good surface quality are sought, in particular in combination with flame retardants, then the reinforcing fibres preferably comprise predominantly (i.e., for example, to an extent of 80% by weight or even more than 90% by weight) flat glass fibres or even exclusively flat glass fibres.

The glass fibres which are used according to the invention as rovings (filler component B) have a diameter of from 10 to 20 µm, preferably from 12 to 18 µm, with the cross section of the glass fibres being able to be round, oval, elliptical, virtually rectangular or rectangular. Particular preference is given to flat glass fibres having a ratio of the cross-sectional axes of from 2 to 5. In particular, E-glass fibres are used according to the invention. However, it is also possible to use all other types of glass fibres, e.g. A-, C-, D-, M-, S-, R-glass fibres or any mixtures thereof or mixtures with E-glass fibres.

In the case of moulding compositions reinforced with long fibres, higher toughnesses and thus more metal-like properties are obtained when continuous glass fibres having a diameter of from 10 to 14 µm, in particular a diameter of from 10 to 12 µm, are used instead of the customary continuous glass fibres having a diameter of from 15 to 19 µm.

The polyamide moulding compositions of the invention can be produced by the known methods for producing long fibre-reinforced rod-shaped pellets, in particular by pultrusion processes in which the continuous fibre roving is completely impregnated with the polymer melt and is subsequently cooled and cut.

The long fibre-reinforced rod-shaped pellets obtained in this way, which preferably have a pellet length of from 3 to 25 mm, in particular from 4 to 12 mm, can be processed further to produce mouldings by the customary processing methods (e.g. injection moulding, pressing).

The continuous carbon fibres used in the pultrusion process have a diameter of from 5 to 10 µm (microns), preferably from 6 to 8 µm. To improve the bonding of the matrix and the fibre handling, the fibres can be coated with chemically different layers which are known for glass fibres and carbon fibres in the prior art.

The glass fibre itself can, depending on the shape of the cross-sectional area and length of the fibre, be selected from the group consisting of E-glass fibres, A-glass fibres, C-glass fibres, D-glass fibres, M-glass fibres, S-glass fibres and R-glass fibres, with preference being given to E-glass fibres.

The fillers and reinforcing materials of the component (B) can also be particulate fillers or a mixture of fibres and particulate fillers. As particulate fillers, preference is given to using mineral fillers based on talc, mica, silicate, quartz, titanium dioxide, wollastonite, kaolin, amorphous silicas, magnesium carbonate, magnesium hydroxide, chalk, lime, feldspar, barium sulphate, solid or hollow glass spheres or milled glass, permanently magnetic or magnetizable metal compounds and/or alloys or mixtures. The fillers can also have been surface-treated.

In a further preferred embodiment, the polyamide moulding composition is characterized in that the proportion of component (C) is in the range 8-25% by weight, preferably in the range 10-22% by weight, particularly preferably in the range 10-18% by weight.

The component (C) is preferably composed of 60-100% by weight, preferably 70-98% by weight, particularly preferably 80-96% by weight, of a phosphinic acid salt and/or diphosphinic acid salt and 0-40% by weight, or 2-30% by weight, or 4-20% by weight, of a nitrogen-containing synergist and/or a nitrogen- and/or phosphorus-containing flame retardant, with the latter preferably being selected from among melamine and condensation products of melamine, in particular melem, melam, melon, and reaction products of melamine with polyphosphoric acid and reaction products of condensation products of melamine with polyphosphoric acid and mixtures thereof, in particular melamine polyphosphate.

The moulding composition of the invention thus additionally contains, in a further embodiment, 8-25% by weight, preferably 10-22% by weight and in particular 10-18% by weight, of a flame retardant, (as part of the component (C) or forming the entire component (C)). The flame retardant is preferably halogen-free.

The flame retardant in the component (C) or forming the entire component (C) preferably comprises 60-100% by weight, more preferably 70-98% by weight, in particular 80-96% by weight, of a phosphinic acid salt and/or diphosphinic acid salt (component (C1)) and 0-40% by weight, preferably 2-30% by weight, in particular 4-20% by weight, of a nitrogen-containing synergist and/or a nitrogen- and phosphorus-containing flame retardant (component (C2)).

Component (C2) is preferably melamine or condensation products of melamine, e.g. melem, melam, melon, or reaction products of melamine with polyphosphoric acid or reaction products of condensation products of melamine with polyphosphoric acid or mixtures thereof.

As component (C2), particular preference is given to melamine polyphosphate. Such flame retardants are known from the prior art. In this respect, reference may be made to DE 103 46 326, which is hereby expressly incorporated by reference into the present text.

As component (C1), preference is given to using a phosphinic acid salt of the general formula I and/or formula (II) and/or polymers thereof

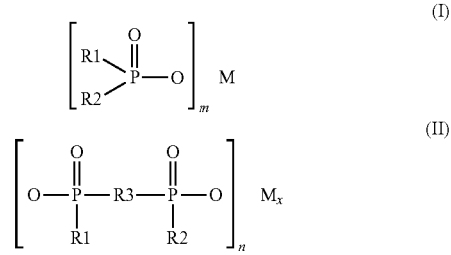

where
R1, R2 are identical or different and are each preferably C1-C8-alkyl, linear or branched, or aryl;

R3 is C1-C10-alkylene, linear or branched, C6-C10-arylene, -alkylarylene or arylalkylene;
M is a metal ion from main or transition group 2 or 3 of the Periodic Table; and
m is 2 or 3;
n is 1 or 3;
x is 1 or 2.

As metal ion M, preference is given to using Al, Ca, Ba and Zn.

In combination with the flame retardant components (C1) and (C2), it is optionally possible to add an additional from 0.5 to 5% by weight, based on the sum of (C1) and (C2), of oxygen-, nitrogen- or sulphur-containing metal compounds as stabilizers (component (C3)). Preferred metals here are aluminium, calcium, magnesium and zinc. Suitable compounds are selected from the group consisting of the oxides, hydroxides, carbonates, silicates, borates, phosphates, stannates and combinations or mixtures of these compounds, e.g. oxide hydroxides or oxide hydroxide carbonates. Examples are magnesium oxide, calcium oxide, aluminium oxide, zinc oxide, magnesium hydroxide, aluminium hydroxide, boehmite, dihydrotalcite, hydrocalumite, calcium hydroxide, tin oxide hydrate, zinc hydroxide, zinc borate, zinc sulphide, zinc phosphate, zinc carbonate, calcium carbonate, calcium phosphate, magnesium carbonate, basic zinc silicate, zinc stannate, calcium stearate, zinc stearate, magnesium stearate, barium stearate, potassium palmitate, magnesium behenate.

Furthermore, it should be emphasized in the context of the polyamide moulding compositions of the invention or the mouldings produced therefrom that excellent flame resistance is achieved in combination with the above-described excellent properties. The moulding composition is given an UL classification of V0 for 0.8 mm thick test specimens (UL-94, test in accordance with the standards of Underwriters Laboratories (U.L.), cf. www.ulstandards.com).

The copolyamides of the invention achieve the fire protection classification "V0" even without addition of synergist (C2). The flame retardant added is therefore preferably made up exclusively of the components C1 and C3 together.

The moulding compositions can contain stabilizers, processing aids and impact modifiers and also further additives.

The moulding compositions of the invention can also contain further additives (D) such as additives from the group consisting of inorganic stabilizers, organic stabilizers, lubricants, dyes, nucleating agents, metallic pigments, metal flakes, metal-coated particles, impact modifiers, antistatics, conductivity additives, mould release agents, optical brighteners, natural sheet silicates, synthetic sheet silicates or mixtures of the additives mentioned. As antistatics, it is possible to use, for example, carbon black and/or carbon nanotubes in the moulding compositions of the invention. However, the use of carbon black can also serve to improve the black coloration of the moulding composition.

As sheet silicates, it is possible to use, for example, kaolins, serpentines, talc, mica, vermiculites, illites, smectites, montmorillonite, hectorite, double hydroxides or mixtures thereof in the moulding compositions of the invention. The sheet silicates can have been surface-treated or can also be untreated.

As stabilizers or aging inhibitors, it is possible to use, for example, antioxidants, light stabilizers, UV stabilizers, UV absorbers or UV blockers in the moulding compositions of the invention.

The polyamides of the invention can be produced on conventional polycondensation plants by the process sequence precondensate and after-condensation. Chain regulators are preferably used for the polycondensation in order to regulate the viscosity. Suitable chain regulators are monoamines or monoacids such as acetic acid, propionic acid, butyric acid, valeric acid, caproic acid, lauric acid, stearic acid, 2-ethylhexanoic acid, cyclohexanoic acid, benzoic acid, butylamine, pentylamine, hexylamine, 2-ethylhexylamine, n-octylamine, n-dodecylamine, n-tetradecylamine, n-hexadecylamine, stearylamine, cyclohexylamine, 3-(cyclohexylamino)propylamine, methylcyclohexylamine, dimethylcyclohexylamine, benzylamine, 2-phenylethylamine, etc. In addition, the viscosity can be adjusted by use of an excess of diamine or diacid.

For the salt solutions to be homogeneous and clear at solution temperatures of from 180 to 230° C., from 20 to 30% of water is usually added to the monomers. To prevent excessive foaming during depressurization and degassing or during after-condensation of the melt in an extruder, an antifoam is preferably added to the mixtures. Suitable antifoams are aqueous silicone emulsions, polydimethylsiloxane on a solid support, e.g. zeolite, water-free, high molecular weight polysiloxane or siloxanes in organic, water-soluble solvents in an amount of from 0.01 to 0.5% by weight.

As polycondensation catalysts, from 0.005 to 1.5% by weight of phosphorus compounds such as phosphoric acid, phosphorous acid, hypophosphorous acid, phenylphosphonic acid, phenylphosphinic acid and/or salts thereof with 1- to 3-valent cations such as Na, K, Mg, Ca, Zn or Al and/or esters thereof, e.g. triphenyl phosphate, triphenyl phosphite or tris(nonylphenyl)phosphite, are preferably added to the monomer mixtures. Preference is given to hypophosphorous acid and sodium hydrogenyphosphate monohydrate in an amount of from 100 to 500 ppm of phosphorous, based on the copolyamide.

Furthermore, the present invention also provides processes for producing such polyamide moulding compositions. In addition, it also provides mouldings produced using such polyamide moulding compositions. As mentioned above, blisters can be formed during soldering in the case of, for example, connectors having a critical thickness and metal inserts which conduct heat inwards. Thicknesses in the range from 1 to 2 mm are frequently particularly critical and start forming blisters at comparatively low temperatures. Relatively thin wall thicknesses form blisters to a lesser degree because in this case no critical amount of water which is capable of forming a blister can accumulate and because water can vaporize readily on heating due to the short diffusion paths. Greater wall thicknesses are likewise less critical because thicker test bars cannot heat up completely during the short heating time. The proposed material is preferably employed in mouldings having a wall thickness in the range 0.5-3 mm, in particular 1-2 mm, with this wall thickness being present at least in the regions which are affected by heat transmission during soldering and in which blisters tend to form.

In addition, the invention provides for uses of mouldings which consist at least partly of such polyamide moulding compositions. Such uses are, for example, parts of printed circuit boards, housings, films, conduits, switches, distributors, relays, resistances, capacitors, coils, lamps, diodes, LEDs, transistors, connectors, regulators, storages and sensors. Further embodiments are indicated in the dependent claims.

BRIEF DESCRIPTION OF THE DRAWINGS

Preferred embodiments of the invention are described below, partly with the aid of the drawing which merely serves for the purposes of illustration and is not to be interpreted as constituting a limitation. In the drawing, FIG. 1 shows the surface temperature of a 1.6 mm thick UL94 burning bar under the conditions of test 2 (cf. Table 4).

DESCRIPTION OF PREFERRED EMBODIMENTS

The invention is illustrated below by means of specific examples and compared with the poorer performance systems according to the prior art. The examples indicated below serve to support the invention and to demonstrate the differences from the prior art, but are not to be interpreted as restricting the general subject matter of the invention as defined in the claims.

Comparative Examples C1 to C8

The polyamides are produced via a precondensate and subsequent after-condensation. The formulation components as shown in Tables 1 and 2 are placed together with catalyst, regulator and water in a 20 l autoclave, heated to a product temperature of 260° C. over a period of from 50 to 80 minutes, maintained at a pressure of 32 bar for one hour and subsequently discharged via a nozzle. The precondensate is dried at 120° C. under a reduced pressure of 30 mbar for 24 hours.

The polyamide precondensate obtained in this way is after-condensed in a twin-screw extruder from Werner and Pfleiderer having a screw diameter of 25 mm at prescribed process parameters (barrel temperature: 340° C., speed of rotation of the screw: 150 rpm, throughput: 6 kg/h). The melt is degassed by means of a stream of nitrogen in zone 10. The product is taken off as extrudate from a nozzle having a diameter of 3 mm and pelletized. The pellets are dried at 100° C. under a reduced pressure of 30 mbar for 24 hours.

The polyamides are injection moulded using an Arburg Allrounder 320-210-750 injection moulding machine at defined barrel temperatures of the zones 1 to 4 and a defined tool temperature to produce ISO test specimens.

Comparative Examples C1-C3 and C7 are pure copolyamide, i.e. without fillers and reinforcing materials, flame retardants and essentially without additives; Comparative Examples C4-C6 and C8 use the copolyamides of Comparative Examples C1-C3 and C7, but with the amounts of fillers and reinforcing materials, flame retardants and additives indicated in Table 3 now added.

TABLE 1

Comparative Examples C1 in accordance with U.S. Pat. No. 4,607,073, C2 in accordance with JP 2928325 and C3 in accordance with EP 1 988 113.

|  | Unit | C1 | C2 | C3 |
|---|---|---|---|---|
| Composition | | | | |
| 1,6-Hexanediamine | parts by weight | 41.64 | 43.00 | 6.49 |
| 1,10-Decanediamine | parts by weight | | | 44.38 |
| Terephthalic acid | parts by weight | 40.86 | 33.15 | 49.13 |
| Isophthalic acid | parts by weight | 17.51 | | |
| Adipic acid | parts by weight | | 23.85 | |
| Injection-moulding conditions | | | | |
| Barrel temperature zone 1 | ° C. | 325 | 315 | 315 |
| Barrel temperature zone 2 | ° C. | 330 | 320 | 320 |
| Barrel temperature zone 3 | ° C. | 335 | 325 | 325 |
| Barrel temperature zone 4 | ° C. | 340 | 330 | 330 |
| Tool temperature | ° C. | 130 | 120 | 130 |

TABLE 1-continued

Comparative Examples C1 in accordance with U.S. Pat. No. 4,607,073, C2 in accordance with JP 2928325 and C3 in accordance with EP 1 988 113.

|  | Unit | C1 | C2 | C3 |
|---|---|---|---|---|
| Properties | | | | |
| Solution viscosity | | 1.58 | 1.67 | 1.62 |
| Melting point | °C. | 325 | 310 | 295 |
| Enthalpy of fusion | J/g | 45 | 60 | 50 |
| Glass transition temp. | °C. | 135 | 94 | 115 |
| Water absorption | % | 5.2 | 6.2 | 2.6 |
| Solderability | % | 78 | 67 | 83 |
| JEDEC SML 1 | | yes | no | yes |

Examples E1 to E13

The production of the polyamides according to the invention is carried out in a manner analogous to the production of the polyamides of Comparative Example C3. The formulation components as per Table 2 are used together with catalyst, regulator and water.

Examples E1-E8 and E14 are the pure copolyamide of the component (A), i.e. without fillers and reinforcing materials, flame retardants and essentially without additives in the proportions shown in Table 2; the Examples E9-E13 and E15 use the copolyamides of Examples E1, E5 and E14, respectively, as indicated in Table 3, but with the amounts of fillers and reinforcing materials, flame retardants and additives indicated in Table 3 being added.

TABLE 2

Composition and properties of the raw polyamides of Examples E1 to E8 and E14 and of Comparative Example C7. Injection moulding conditions as in Comparative Example C3.

|  | Unit | C7 | E1 | E2 | E3 | E4 | E5 | E6 | E7 | E8 | E14 |
|---|---|---|---|---|---|---|---|---|---|---|---|
| 1,6-Hexanediamine | parts by weight | 31.03 | 31.99 | 31.57 | 30.31 | 29.50 | 29.66 | 29.50 | 27.42 | 25.34 | 31.06 |
| 1,10-Decanediamine | parts by weight |  | 12.20 | 12.71 | 14.26 | 15.27 | 15.35 | 15.27 | 17.83 | 20.40 | 13.90 |
| Trimethylhexanediamine | parts by weight | 13.36 | | | | | | | | | |
| Terephthalic acid | parts by weight | 42.26 | 44.37 | 46.19 | 46.83 | 47.11 | 47.25 | 48.11 | 47.58 | 49.49 | 42.30 |
| Isophthalic acid | parts by weight | 13.35 | 11.44 | 9.53 | 8.59 | 8.12 | 7.48 | 7.13 | 7.17 | 4.78 | 12.74 |
| Proportion of decanediamine | % by weight | 0 | 27.6 | 28.7 | 32.0 | 34.1 | 34.1 | 34.1 | 39.4 | 44.6 | 30.9 |
| Proportion of trimethylhexanediamine | % by weight | 30.1 | | | | | | | | | |
| Proportion of IPA | % by weight | 24.0 | 20.5 | 17.1 | 15.5 | 14.7 | 13.6 | 12.9 | 13.1 | 8.8 | 23.2 |
| Solution viscosity |  | 1.51 | 1.61 | 1.51 | 1.69 | 1.71 | 1.56 | 1.53 | 1.70 | 1.73 | 1.62 |
| Melting point | °C. | 301 | 311 | 322 | 315 | 313 | 318 | 321 | 309 | 309 | 303 |
| Enthalpy of fusion | J/g | 38 | 47 | 57 | 51 | 51 | 56 | 58 | 47 | 49 | 42 |
| Glass transition temperature | °C. | 137 | 129 | 128 | 130 | 129 | 128 | 128 | 129 | 127 | 129 |
| Water absorption | % by weight | 5.2 | 4.2 | 3.8 | 3.7 | 3.6 | 3.6 | 3.6 | 3.6 | 3.5 | 4.6 |
| Solderability | % | 6 | 85 | 88 | 90 | 97 | 99 | 97 | 94 | 97 | 85 |
| JEDEC SML1 |  | no | yes | yes | yes | yes | yes | yes | yes | yes | yes |

TABLE 3

Composition and properties of the compounds from Comparative Examples C4-C6 and C8 and from Examples E9 to E13 and E15; injection moulding conditions for Comparative Examples C4 to C6 as in C1 to C3 and for Examples E9 to E13, E15 and C8 as in C3.

|  | Unit | C4 | C5 | C6 | E9 | E10 | E11 | E12 | E13 | E15 | C8 |
|---|---|---|---|---|---|---|---|---|---|---|---|
| Polyamide type from | — | C1 | C2 | C3 | E1 | E5 | E5 | E5 | E5 | E14 | C7 |
| Polyamide | % by weight | 55.2 | 57.2 | 55.2 | 55.75 | 55.75 | 67.8 | 86.9 | 83.9 | 55.75 | 55.75 |
| Alugel 34TH | % by weight | 0.3 | 0.5 | 0.3 | 0.15 | 0.15 | | | | 0.15 | 0.15 |
| Barium stearate | % by weight | | | | 0.6 | 0.6 | 0.5 | 0.5 | 0.5 | 0.6 | 0.6 |
| Irganox 1098 | % by weight | 0.5 | 0.3 | 0.5 | 0.5 | 0.5 | 0.5 | 0.5 | 0.5 | 0.5 | 0.5 |
| Melapur 200/70 | % by weight | 0.5 | | 0.5 | | | | | | | |
| Zinc carbonate | % by weight | 0.5 | | 0.5 | | | | | | | |
| Zinc oxide AC | | | | | | | | 0.1 | 0.1 | | |
| Exolit OP1230 | % by weight | 12.0 | 12.0 | 12.0 | 12.0 | 12.0 | | 12.0 | 15.0 | 12.0 | 12.0 |
| Black masterbatch | % by weight | 1.0 | | 1.0 | 1.0 | 1.0 | 1.2 | | | 1.0 | 1.0 |

TABLE 3-continued

Composition and properties of the compounds from Comparative Examples C4-C6 and C8 and from Examples E9 to E13 and E15; injection moulding conditions for Comparative Examples C4 to C6 as in C1 to C3 and for Examples E9 to E13, E15 and C8 as in C3.

|  | Unit | C4 | C5 | C6 | E9 | E10 | E11 | E12 | E13 | E15 | C8 |
|---|---|---|---|---|---|---|---|---|---|---|---|
| GF Vetrotex 995 EC10-4.5 | % by weight | 30.0 | 30.0 | 30.0 | 30.0 | 30 | 30 |  |  | 30.0 | 30 |
| Solution viscosity |  | 1.558 | 1.562 | 1.520 | 1.495 | 1.497 | 1.480 | 1.589 | 1.554 | 1.495 | 1.497 |
| Melting point | °C. | 325 | 310 | 295 | 309 | 318 | 318 | 318 | 318 | 303 | 300 |
| Enthalpy of fusion | J/g | 26 | 30 | 30 | 28 | 27 | 36 | 48 | 46 | 20 | 24 |
| Glass transition temperature | °C. | 132 | 98 | 115 | 124 | 125 | 127 | 125 | 125 | 125 | 134 |
| Water absorption | % by weight | 2.5 | 3.5 | 1.9 | 2.3 | 2.3 | — | — | — | 2.4 | 2.9 |
| Solderability | % | 50 | 10 | 59 | 82 | 84 | 78 | 77 | 84 | 83 | 0 |
| JEDEC SML1 |  | no | no | yes | yes | yes | yes | yes | yes | yes | no |
| Tensile E modulus | MPa | 10800 | 10900 | 9600 | 11500 | 11600 | 10900 | 4000 | 4100 | 10900 | 11000 |
| Tensile strength | MPa | 121 | 124 | 128 | 150 | 152 | 143 | 79 | 72 | 140 | 130 |
| Elongation at break | % | 1.6 | 1.5 | 1.9 | 2.0 | 1.9 | 1.8 | 3.0 | 2.6 | 2.1 | 1.7 |
| Impact toughness | kJ/m$^2$ | 43 | 28 | 47 | 50 | 50 | 35 | 48 | 42 | 60 | 30 |
| Notched impact toughness | kJ/m$^2$ | 5.3 | 7.1 | 7.6 | 6.6 | 9.6 | 8.5 | 4.6 | 4.2 | 9.6 | 5.5 |
| UL94 |  | V0 | V0 | V0 | V0 | V0 | HB | V2 | V0 | V0 | V0 |

Melapur ® 200/70: Melamine polyphosphate (Ciba Spez. GmbH), flame retardant, CAS No: 218768-84-4
Exolit ® GP1230: Organophosphorus salt (Clariant Produkte GmbH), flame retardant.
Alugel 34TH: Aluminium stearate additive from Baerlocher
Irganox 1098: Sterically hindered phenolic antioxidant from Ciba Spez. GmbH
Vetrotex 995: Cut glass fibres having a length of 4.5 mm and a diameter of 10 μm (circular cross section) from Owens Corning Fiberglas It can be seen from Tables 1-2 above that when component (A) alone is examined, the comparative systems C1 and C2 are far inferior to the proposed systems both in respect of water absorption and in respect of solderability. The water absorption is significantly higher in these systems of the prior art and the solderability is significantly lower. Although the water absorption is low in the comparative system C3, the solderability is unsatisfactory for many practical applications, as indicated at the outset.

In the case of the polyamide moulding compositions as per Table 3 containing fillers and reinforcing materials, flame retardants and additives, too, it is found that the systems according to the invention in each case represent a better compromise between low water absorption and high solderability when compared with Comparative Examples C4-C6.

Comparison of C7 with E14 and C8 with E15 clearly and impressively shows that, surprisingly, no solderable moulding compositions are obtained on the basis of branched diamines C9-C12, in contrast to the straight-chain (unbranched), aliphatic diamines C9-C12 (E14, E15) used according to the invention.

The measurements were carried out in accordance with the following standards and on the following test specimens.

Thermal Behaviour:
Melting point, enthalpy of fusion and glass transition temperature (Tg):
ISO standard 11357-11-2
Pellets
Differential Scanning Calorimetry (DSC) was carried out at a heating rate of 20° C./min.
For the glass transition temperature (Tg), the onset temperature is reported.

Relative Viscosity:
DIN EN ISO 307, in 0.5% strength by weight m-cresol solution, temperature 20° C.,
Pellets Tensile E Modulus, Tensile Strength and Tear Strength:
ISO 527 using an elongation rate of 50 mm/min (unreinforced variants) or an elongation rate of 5 mm/min (reinforced variants)
ISO tensile bar, standard: ISO/CD 3167, type A1, 170×20/10×4 mm, temperature 23° C.

Charpy Impact Toughness:
ISO 179/*eU
ISO test bar, standard: ISO/CD 3167, type B1, 80×10×4 mm, temperature 23° C.
*1=not instrumented, 2=instrumented Charpy Notched Impact Toughness:
ISO 179/*eA
ISO test bar, standard: ISO/CD 3167, type B1, 80×10×4 mm, temperature 23° C.
*1=not instrumented, 2=instrumented Water Absorption:
Weight change of tensile bars in accordance with ISO 527 in water at 95° C. for a time of 336 hours Solderability:
UL94 burning bars having thicknesses of 0.8, 1.6 and 3.2 mm are injection moulded. These bars are stored at 85° C. and 85% relative humidity for 168 hours in an Allen 600 controlled atmosphere cabinet from Angelantoni Industrie s.p.a. (IT) as described in the Joint Industry Standard IPC/JEDEC J-STD-020D.1 for moisture sensitivity level 1 (SML 1). 5 test bars of each of the three different thicknesses are then placed on a plate (one-sided heating) and transported at a belt speed of 200 mm/min through a Reflow soldering system RO300FC from Essemtec AG (CH). The heating zones are set to the temperatures shown in Table 4. Test 2 (one-sided) gives the prescribed soldering profile with a peak temperature of 260° C. for a 1.6 mm thick UL94 burning bar. The surface temperature of a 1.6 mm thick UL94 burning bar is above 255° C. for 54 sec and above 260° C. for 22 sec, as shown in FIG. 1. 5 test bars of each of the three different thicknesses are subsequently placed directly on the wire mesh without a plate and thus subjected to two-sided heating. To calculate the solderability, the number of test bars without blisters is divided by the total number of test bars tested (=90) and multiplied by 100%.

TABLE 4

Temperature settings of the heating zones of the Reflow soldering system.

|  | Zone 1 [° C.] | Zone 2 [° C.] | Zone 3 [° C.] |
|---|---|---|---|
| Test 1 (one-sided) | 155 | 235 | 280 |
| Test 2 (one-sided) | 155 | 235 | 285 |
| Test 3 (one-sided) | 155 | 235 | 295 |
| Test 4 (two-sided) | 140 | 230 | 265 |
| Test 5 (two-sided) | 140 | 230 | 275 |
| Test 6 (two-sided) | 140 | 230 | 285 |

JEDEC SML 1:

1.6 mm thick UL94 burning bars achieve moisture sensitivity level 1 (SML 1). This means that no blisters can be observed under the conditions of test 2 (one-sided) as per Table 4 and the temperature profile shown in FIG. 1 after conditioning at 85° C. and 85% relative humidity for 168 hours.

The invention claimed is:

1. Polyamide moulding composition having the following composition:
   (A) 30-100% by weight of a partially aromatic, partially crystalline copolyamide made up of
      100% by weight of diacid fraction composed of:
         72.0-98.3% by weight diacid selected from the group of: terephthalic acid, naphthalenedicarboxylic acid or mixtures thereof;
         28.0-1.7% by weight of isophthalic acid;
      and 100% by weight of diamine fraction composed of:
         51.0-80.0% by weight of 1,6-hexanediamine;
         20.0-49.0% by weight of aliphatic, unbranched C9-C12-diamine;
   (B) 0-70% by weight of fillers and reinforcing materials;
   (C) 0-25% by weight of flame retardants;
   (D) 0-5% by weight of additives;
   wherein the components (A)-(D) add up to 100% by weight.

2. Polyamide moulding composition according to claim 1, wherein the aliphatic, unbranched C9-C12-diamine is a diamine selected from the group consisting of: 1,9-nonanediamine, 1,10-decanediamine, 1,11-undecanediamine, 1,12-dodecanediamine, or a mixture of such diamines.

3. Polyamide moulding composition according to claim 1, wherein the diamine fraction of the component (A) is composed of
   55.0-75.0% by weight of 1,6-hexanediamine;
   25.0-45.0% by weight of aliphatic, unbranched C9-C12-diamine.

4. Polyamide moulding composition according to claim 1, wherein the diamine fraction of the component (A) is composed of
   55.0-70.0% by weight of 1,6-hexanediamine;
   30.0-45.0% by weight of aliphatic, unbranched C9-C12-diamine.

5. Polyamide moulding composition according to claim 1, wherein the diacid fraction of the component (A) is composed of
   72.0-98.3% by weight of diacid selected from the group of: terephthalic acid, naphthalenedicarboxylic acid or mixtures thereof
   and an isophthalic acid content in a % by weight range determined as a function of the content of aliphatic, unbranched C9-C12-diamine in percent of the diamine fraction according to the formula IPA (% by weight)=(39−0.7*C9-C12-diamine)

with a range of +/−5% by weight.

6. Polyamide moulding composition according to claim 1, wherein the proportion of component (B) is in the range 20-65% by weight.

7. Polyamide moulding composition according to claim 1, wherein the partially aromatic, partially crystalline copolyamide of the component (A) has a solution viscosity measured in m-cresol at 0.5% by weight measured at a temperature of 20° C. of not more than 2.0.

8. Polyamide moulding composition according to claim 1, wherein the partially aromatic, partially crystalline copolyamide of the component (A) has a glass transition temperature in the range 110-140° C.

9. Polyamide moulding composition according to claim 1, wherein the partially aromatic, partially crystalline copolyamide of the component (A) has an enthalpy of fusion in the range 30-60 J/g.

10. Polyamide moulding composition according to claim 1, wherein the component (A) and/or the entire polyamide moulding composition has a water absorption of less than 5% by weight.

11. Polyamide moulding composition according to claim 1, wherein the fillers and reinforcing materials of the component (B) are fibres.

12. Polyamide moulding composition according to claim 1, wherein the fillers and reinforcing materials of the component (B) are selected from the group of: particulate fillers, a mixture of fibres and particulate fillers.

13. Polyamide moulding composition according to claim 1, wherein the proportion of component (C) is in the range 8-25% by weight.

14. Polyamide moulding composition according to claim 1, wherein stabilizers, processing aids, inorganic stabilizers, organic stabilizers, lubricants, dyes, nucleating agents, metallic pigments, metal flakes, metal-coated particles, impact modifiers, antistatics, conductivity additives, mould release agents, optical brighteners, natural sheet silicates, synthetic sheet silicates or mixtures of the additives mentioned are present as additives of the component (D).

15. Moulding produced using a polyamide moulding composition according to claim 1.

16. Polyamide moulding composition according to claim 1, wherein the aliphatic, unbranched C9-C12-diamine is a diamine selected from the group consisting of:
   1,10-decanediamine and 1,12-dodecanediamine and mixtures thereof.

17. Polyamide moulding composition according to claim 1, wherein the aliphatic, unbranched C9-C12-diamine is 1,10-decanediamine alone.

18. Polyamide moulding composition according to claim 5, wherein isophthalic acid (IPA) content is in a range of +/−3% by weight of value according to the formula.

19. Polyamide moulding composition according to claim 5, wherein isophthalic acid (IPA) content is in a range of +/−2% by weight of value according to the formula.

20. Polyamide moulding composition according to claim 1, wherein the partially aromatic, partially crystalline copolyamide of the component (A) has a solution viscosity measured in m-cresol at 0.5% by weight measured at a temperature of 20° C. of not more than 1.9.

21. Polyamide moulding composition according to claim 1, wherein the partially aromatic, partially crystalline copolyamide of the component (A) has a solution viscosity measured in m-cresol at 0.5% by weight measured at a temperature of 20° C. of 1.8.

22. Polyamide moulding composition according to claim 1, wherein the partially aromatic, partially crystalline copolyamide of the component (A) has a glass transition temperature in the range 115-135°.

23. Polyamide moulding composition according to claim 1, wherein the partially aromatic, partially crystalline copolyamide of the component (A) has a glass transition temperature in the range 120-130° C.

24. Polyamide moulding composition according to claim 1, wherein the partially aromatic, partially crystalline copolyamide of the component (A) has a melting point in the range 300-330° C.

25. Polyamide moulding composition according to claim 1, wherein the partially aromatic, partially crystalline copolyamide of the component (A) has a melting point in the range 305-325° C.

26. Polyamide moulding composition according to claim 1, wherein the partially aromatic, partially crystalline copolyamide of the component (A) has a melting point in the range 310-325° C.

27. Polyamide moulding composition according to claim 1, wherein the partially aromatic, partially crystalline copolyamide of the component (A) has an enthalpy of fusion in the range 35-60 J/g.

28. Polyamide moulding composition according to claim 1, wherein the partially aromatic, partially crystalline copolyamide of the component (A) has an enthalpy of fusion in the range 40-60 J/g.

29. Polyamide moulding composition according to claim 1, wherein the component (A) and/or the entire polyamide moulding composition has a water absorption of less than 4% by weight, after 336 hours in water at temperature of 95° C.

30. Polyamide moulding composition according to claim 1, wherein the component (A) and/or the entire polyamide moulding composition has a water absorption of less than 4% by weight.

31. Polyamide moulding composition according to claim 1, wherein the component (A) and/or the entire polyamide moulding composition has a water absorption of less than 5% by weight after 336 hours in water at temperature of 95° C.

32. Polyamide moulding composition according to claim 1, wherein the fillers and reinforcing materials of the component (B) are glass fibres and/or carbon fibres.

33. Polyamide moulding composition according to claim 32, wherein the fibres are short fibres, having a length in the range 2-50 mm, or continuous fibres, wherein these fibres have a circular and/or noncircular cross-sectional area.

34. Polyamide moulding composition according to claim 1, wherein the fillers and reinforcing materials of the component (B) are fibres having a noncircular cross-sectional area, with the length ratio of the main cross-sectional axis to the secondary cross-sectional axis being >2.

35. Polyamide moulding composition according to claim 1, wherein the fillers and reinforcing materials of the component (B) are fibres having a noncircular cross-sectional area, with the length ratio of the main cross-sectional axis to the secondary cross-sectional axis being in the range 2-5.

36. Polyamide moulding composition according to claim 12, wherein the fillers are mineral fillers based on talc, mica, silicate, quartz, titanium dioxide, wollastonite, kaolin, amorphous silicas, magnesium carbonate, magnesium hydroxide, chalk, lime, feldspar, barium sulphate, solid or hollow glass spheres or milled glass, permanently magnetic or magnetizable metal compounds and/or alloys or mixtures as particulate fillers.

37. Polyamide moulding composition according to claim 1, wherein the proportion of component (C) is in the range 10-18% by weight, with the component (C) being composed of 60-100% by weight of a phosphinic acid salt and/or diphosphinic acid salt and 0-40% by weight, of a nitrogen-containing synergist and/or a nitrogen- and/or phosphorus-containing flame retardant.

38. Polyamide moulding composition according to claim 1, wherein the proportion of component (C) is in the range 10-18% by weight, with the component (C) being composed of 80-96% by weight, of a phosphinic acid salt and/or diphosphinic acid salt and 0-40% by weight, and 4-20% by weight, of a nitrogen-containing synergist and/or a nitrogen- and/or phosphorus-containing flame retardant.

39. Polyamide moulding composition according to claim 1, wherein the proportion of component (C) is in the range 10-18% by weight, with the component (C) being composed of 80-96% by weight, of a phosphinic acid salt and/or diphosphinic acid salt and 0-40% by weight, and 4-20% by weight, of a nitrogen-containing synergist and/or a nitrogen- and/or phosphorus-containing flame retardant, with the latter being selected from among melamine or condensation products of melamine, in particular melem, melam, melon, or reaction products of melamine with polyphosphoric acid or reaction products of condensation products of melamine with polyphosphoric acid or mixtures thereof.

40. Polyamide moulding composition according to claim 1, wherein the additives of the component (D), are carbon black and/or carbon nanotubes as antistatics.

41. Moulding produced using a polyamide moulding composition according to claim 1, in the form of an electrical or electronic component, a printed circuit board, a part of a printed circuit board, a housing component, a film, a conduit, in particular in the form of a switch, a distributor, a relay, a resistance, a capacitor, a coil, a lamp, a diode, an LED, a transistor, a connector, a regulator, a storage and/or a sensor.

* * * * *